United States Patent
Chan et al.

(10) Patent No.: US 7,016,708 B1
(45) Date of Patent: Mar. 21, 2006

(54) HANDS-FREE DEVICE FOR VEHICLE HEADREST AND METHOD OF USE

(75) Inventors: Arnold Yuk Fung Chan, Hong Kong (HK); Alan Ka Lun Wong, Kowloon (HK); Heli Säde, Salo (FI); Valtteri Eroma, Espoo (FI)

(73) Assignee: Nokia Corporation, Espoo (FI)

( * ) Notice: Subject to any disclaimer, the term of this patent is extended or adjusted under 35 U.S.C. 154(b) by 696 days.

(21) Appl. No.: 09/929,023

(22) Filed: Aug. 15, 2001

(51) Int. Cl.
*H04M 1/00* (2006.01)

(52) U.S. Cl. .................. 455/569.1; 381/389; 455/90; 455/575.1

(58) Field of Classification Search ............. 381/389, 381/362; 455/90
See application file for complete search history.

(56) References Cited

U.S. PATENT DOCUMENTS 6,094,496 A * 7/2000 Stowers, Sr. ............... 381/362
6,356,645 B1 * 3/2002 Trenkle ...................... 381/389
6,567,651 B1 * 5/2003 Whitley ...................... 224/929

FOREIGN PATENT DOCUMENTS

| DE | 100 43 918 A1 | 3/2001 |
| EP | 0 715 575 B1 | 11/1998 |
| EP | 0 917 988 A1 | 5/1999 |

* cited by examiner

*Primary Examiner*—Fan Tsang
*Assistant Examiner*—Lisa Hashem
(74) *Attorney, Agent, or Firm*—Alston & Bird LLP

(57) ABSTRACT

The invention involves a hands-free device and method of use with a mobile phone and a vehicle seat headrest support structure. The hands-free device includes a speaker and a microphone for use in combination with a connecting structure that couples the device to the connecting structure and simultaneously allows the connecting structure to engage the vehicle headrest support structure to secure the speaker and the microphone of the device adjacent the head of an occupant of the seat to thereby allow the seat occupant to hear information communicated via the mobile phone and the speaker of the device while the occupant may simultaneously communicate via the microphone of the device.

33 Claims, 7 Drawing Sheets

HANDS-FREE DEVICE FOR VEHICLE HEADREST AND METHOD OF USE

FIELD OF THE INVENTION

This invention relates to a hands-free device that includes a speaker and a microphone and is used with a mobile phone and a vehicle seat headrest support structure.

BACKGROUND OF THE INVENTION

In recent years the world wide massive proliferation of mobile phone sales and their use in a myriad of environments, especially motor vehicles, has greatly increased safety concerns when vehicle drivers attempt to use their phones while driving. These concerns center on the obvious need for the vehicle driver to keep both hands on the steering wheel, rather than holding a mobile phone to their ear with one hand while steering in congested traffic conditions. More and more countries are passing laws that prohibit drivers from using mobile phones while they drive if both hands are not completely free to steer and engage steering column mounted controls such as lights, turn signals and windshield wipers, not to mention a host of dashboard mounted controls for such accessories as radio, CD and tape player as well as heating and air conditioning.

In response to these laws there now exist a host of mobile phone kits that allow drivers to secure their mobile phones to portable devices that hold the mobile phones separate from the drivers, usually in the region of the vehicle's dashboard. These mobile phone kits are frequently quite ingenious in their use of cigarette lighter power receptacles to power the phone and simultaneously charge the mobile phone battery. Some kits include a speakerphone and employ a microphone that captures the voice of the driver. Other kits connect the phone to the vehicle's FM radio and broadcast incoming messages over the radio loud speakers. Still others utilize handsets equipped with a microphone and ear phones. More recently the need for a hands-free mobile phone has been answered by incorporating a loud speaker in a vehicle headrest and mounting a microphone on the sun visor or on a flexible arm, which may be attached under the roof. European Patent EP0715 575 B1 granted Nov. 11, 1998 teaches the idea of incorporating a separate loud speaker in a vehicle headrest to be adjacent the user's ear. The loud speaker is provided with connections which are connected by wiring to the mobile phone. A microphone arranged on a flexible arm is rotatably mounted on the headrest.

As noted just above a majority of the hands-free kit type devices are designed to be installed on the center console or dashboard of a vehicle, which is located far from the head position of the driver. The ambient noise in a vehicle operating environment inherently reduces the voice pick-up and audio performance of this type of hands-free arrangement. The down side of this type of arrangement occurs when the other party to a conversation with a vehicle phone user complains of difficulty hearing. The usual response of the vehicle phone user is to shout in the direction of the dash-mounted, hands-free device. Rarely does shouting improve the clarity of the driver's voice. The listener at the other end of the call continues to express difficulty discerning the words of the vehicle phone user, which is generally followed by even louder shouting, coupled with a marked slowing down of speech.

Another hands-free approach, for use in conjunction with a vehicle headrest that is secured by means of pillars between the headrest and the top of the vehicle seat, employs a long mounting plate with bushings of different inner diameters. First the user selects a particular pair of bushings with the same inner diameter as that of the pillars that support the headrest. This is followed by the user removing the headrest with the integrally included pillars. The mounting bushings are then mounted upon the pillars followed by locating the pillars with matching bushings into the mounting plate prior to reinstalling the pillars into the top of the seat. A speaker and microphone, which are electrically coupled to the mobile phone, are then secured to the mounting plate as well.

Yet another hands-free approach that involves the use of a headrest support pillar calls for the use of a mounting plate that integrally includes a small swing arm that incorporates a speaker. The mounting plate involves the use of a single pillar and employs various sized bushings mounted in the plate to accommodate different diameter headrest pillar sizes. In this arrangement a microphone of the device is placed on the vehicle dashboard and both the speaker and microphone are electrically coupled to the mobile phone. The location of the microphone on the dashboard produces the same problem with the transmission of the vehicle driver's voice noted above.

It should be readily apparent that a hands-free speaker/microphone combination integrated into a headrest cannot be detached and moved from vehicle to vehicle, since currently there is no standardization in headrest/pillar support structure dimensions. Inherent in some of the just described approaches is unavoidable inconvenience: the need to have on hand a variety of different sized bushings and the necessity of removing the headrest and support pillars to install the hands-free arrangements.

The instant invention avoids all of the problems involved with the prior art approaches. It is remarkably simple and exceedingly expeditious to use universally with virtually any headrest support structure, irrespective of the exact structural nature of the headrest support structure, in almost all vehicles.

SUMMARY OF THE INVENTION

The hands-free device of the instant invention is intended for use with a mobile phone and a vehicle seat support structure. The device includes a speaker and a microphone for use in combination with a connecting structure. The device is coupled to the connecting structure, allowing the connecting structure to engage the vehicle seat headrest support structure with the speaker and microphone adjacent the head of an occupant of the seat. The seat occupant is thereby able to hear information communicated via a mobile phone electrically coupled to the speaker of the hands-free device, while simultaneously allowing the occupant to communicate via the microphone of the device.

More specifically, the hands-free device is intended for use with a mobile phone and a vehicle headrest support structure of the type that includes a pair of pillars that extend from the headrest into a top portion of a vehicle seat. The device is comprised of a generally elongated shaped housing that includes therein a speaker, and is provided at one end thereof with a microphone assembly. In a preferred embodiment the elongated shaped housing is provided with a strap-securing structure that accommodates a strap end that passes through the strap-securing structure and around both pillars to be secured with a strap fastener at another end of the strap, to thereby secure the device between the pillars and intermediate the headrest at the top of the seat. The strap-securing structure includes a span portion that is in part coupled to the strap over a section of the strap to thereby ensure that the elongated housing of the device is physically secured to and stably aligned with the strap in a generally parallel relationship to the strap over the strap section. The elongated housing portion that spans the strap section does so in such a manner that the device and strap are slidably secured relative to each other. The strap section resides between the elongated housing and the housing span portion, which is structurally configured to provide a region thereof adapted to receive a mating portion of a module fastener. A movable module is secured to the strap for movement on the strap. The module is provided with a mating fastener portion that allows the module to be fastened to the mating portion of the housing span portion after the device, strap and strap fastener have been secured as a unit to the pillar support structure of the headrest. When the device is secured to the pair of pillars the strap extends from the strap fastener, as noted above, around a pillar, to and through the span portion of the device and then around the other pillar and then through the movable module secured thereto and finally returning to a secured relationship with the strap fastener.

At the moment the movable module is fastened to the housing span portion, the strap takes on an overall figure "8" shaped configuration around the support pillars. A highly stable physical relationship is thereby established between the device, the strap and pillars behind the neck and head of a vehicle occupant.

A microphone assembly comprised of a flexible arm having a microphone at one end is provided at one end of the elongated housing. The flexible arm and microphone are manually positionable to allow the occupant in the vehicle seat to adjust the microphone location to proximate the mouth of the occupant.

The invention further broadly embraces a method of providing a mobile phone hands-free speaker and microphone for use with a vehicle seat, headrest and headrest support structure of the type comprised of a pair of pillars that structurally connect the headrest and a top of the vehicle seat. More particularly the method is comprised of the following steps. First, positioning a generally elongated hands-free speaker and microphone device adjacent the pair of pillars such that a projection of a line coincident with a centerline of the elongated device intersects the pair of pillars in a generally perpendicular manner.

Second, securing the elongated device to the pair of pillars to thereby constrain the device positionally to be in a parallel relationship with the centerline of the device and in a generally perpendicular relationship to the pillars to thereby provide a physically stable arrangement with the hands-free device secured to the headrest and seat via the pillars in close proximity to the neck and head of a mobile phone user employing the device when the mobile phone user/occupant is in the vehicle seat.

A primary advantage/objective of this invention resides in its effortless utility. It provides a hands-free device having a speaker and microphone for use with a mobile phone and a vehicle seat headrest support structure wherein the hands-free device is highly portable and is nearly universal in its use with a wide range of vehicle headrest support structures.

Another advantage/objective of this invention resides in the provision of a hands-free device having a speaker and microphone that easily mounts on almost any headrest support structure in a highly physically stable relationship with the speaker adjacent the neck of an occupant/driver while simultaneously providing an easily positionable microphone proximate the mouth of the driver.

Yet another object/advantage of the invention resides in its ease and convenience. A simple, two-step method secures a mobile phone hands-free speaker microphone for use with a vehicle seat, headrest and seat headrest support structure of the type comprised of a pair of pillars that structurally connect the headrest and a top of the vehicle seat by first positioning a generally elongated hands-free speaker and microphone device adjacent the pillar such that projection of a line coincident with a centerline of the elongated device intersects the pair of pillars in a perpendicular manner, followed by securing the elongated device to the pillars such that the device is constrained in a stable manner to the pillars in close proximity to the neck and head of a mobile phone user employing the device when the phone user/occupant is in the vehicle seat.

BRIEF DESCRIPTION OF THE DRAWINGS

The present invention is further described in the detailed description which follows in reference to the noted plurality of drawings by way of nonlimiting examples of embodiments of the present invention in which like reference numerals represent similar parts throughout the several views of the drawings and wherein.

DETAILED DESCRIPTION OF THE PREFERRED EMBODIMENT

Figure 1:
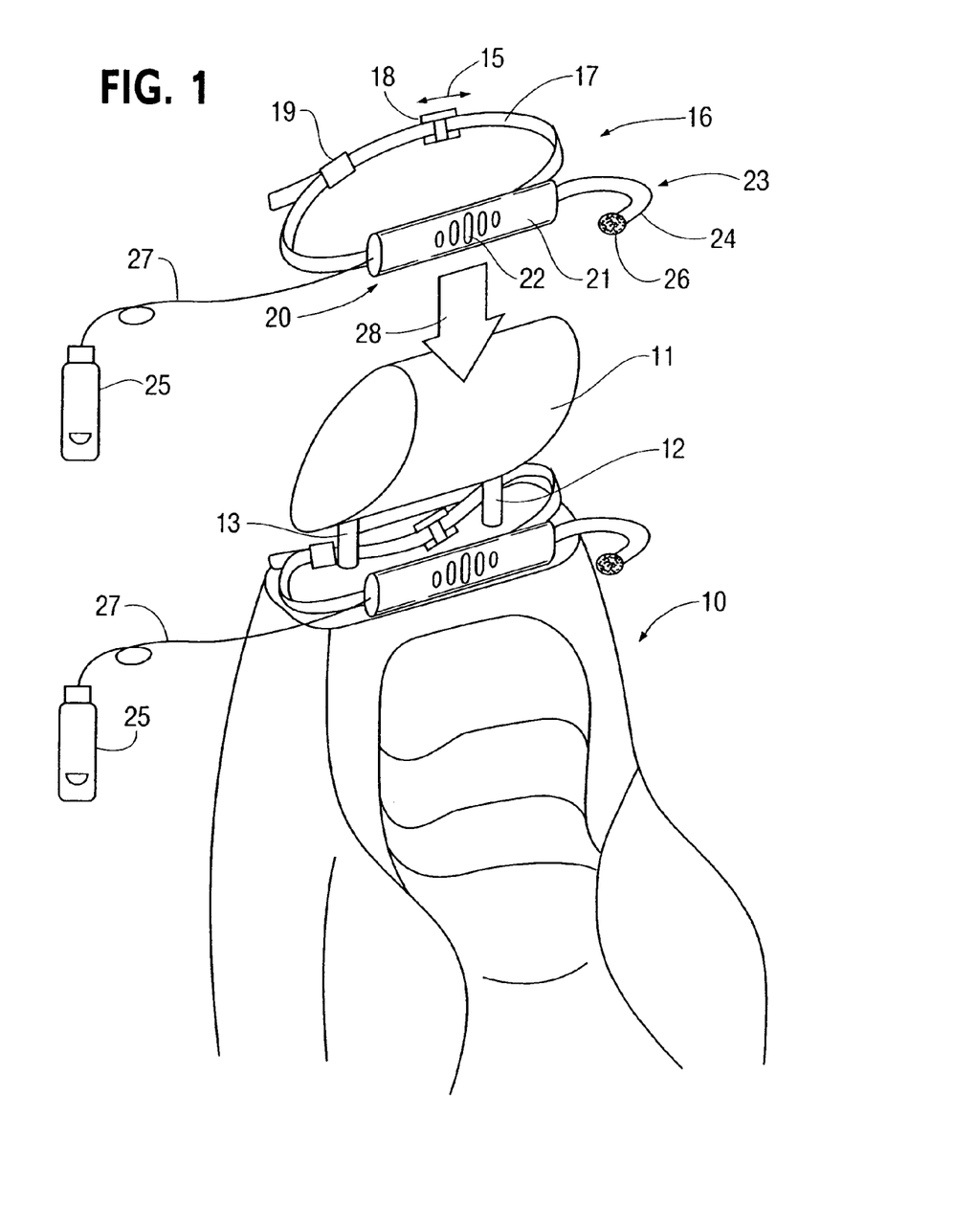
FIG. 1 illustrates a vehicle seat with a conventional headrest and headrest support structure that also illustrates the hands-free device of the subject invention in two different positions of an installation procedure.

Reference is now made to FIG. 1 which illustrates a vehicle seat 10 with a conventional headrest 11 and headrest support structure that is comprised of a pair of support pillars 12, 13, that engage the top of the vehicle seat as shown. The headrest 11 is movable up and down by means of a mechanism integral with the seat and not shown in FIG. 1, as it forms no part of this invention. A hands-free assembly 16, embodying a preferred configuration of the invention, is shown above the headrest 11 in a position just prior to installation. The hands-free assembly includes a strap 17, a movable module 18, a strap fastener buckle 19 and the hands-free device 20. The movable module 18 is movable in the directions indicated by double ended directional arrow 15. The hands-free device 20 includes an elongated housing 21, which includes a speaker 22, schematically shown as a plurality of vertical, unreferenced openings in the front of the elongated housing 21. At the right hand of the hands-free device 20 there is portrayed a microphone assembly 23 that includes an adjustable flexible arm 24, which may be of the goose neck type. A microphone 26 is shown located at the end of the flexible arm 24. A mobile phone 25 is depicted electrically coupled to the hands-free device 20 by means of a cable 27. Immediately beneath the hands-free assembly 16 an arrow 28 is present. The arrow 28 is intended to indicate the direction the hands-free assembly 16 is to travel, as it moves to an initial, unsecured position beneath the headrest and the top of the vehicle seat 10 as is shown in FIG. 1. The hands-free device 20 with its speaker 22 in the elongated housing 21 and microphone assembly 16 are shown in detail as in FIG. 1. The strap fastener buckle 19 is shown secured to the strap 17 and is conventional in its construction and for that reason will not be described in detail. In this, the preferred embodiment of the invention, the strap 17 is made of a rubbery material with an inner fabric lining. Although not shown, within the interior of the elongated housing 21, in addition to the speaker 22, there may be an electronic circuit board. The circuit board may provide a number of functions, such as, but not limited to, ensuring that the hands-free device is electronically compatible with the mobile phone. Because the circuit board draws its power from mobile phone 28 via cable 25, it may provide any number of functions, such as changing the volume of the speaker by means of a voice command, or such exotic functions as suppressing background noise for the microphone 26.

The movable clip module 18 is shown mounted on the strap 17 for sliding movement along the strap 17. This movement is accomplished by manually gripping the movable module 18 with one's fingers while the strap is in a stationary position as will be described more fully hereinafter.

Figure 2:
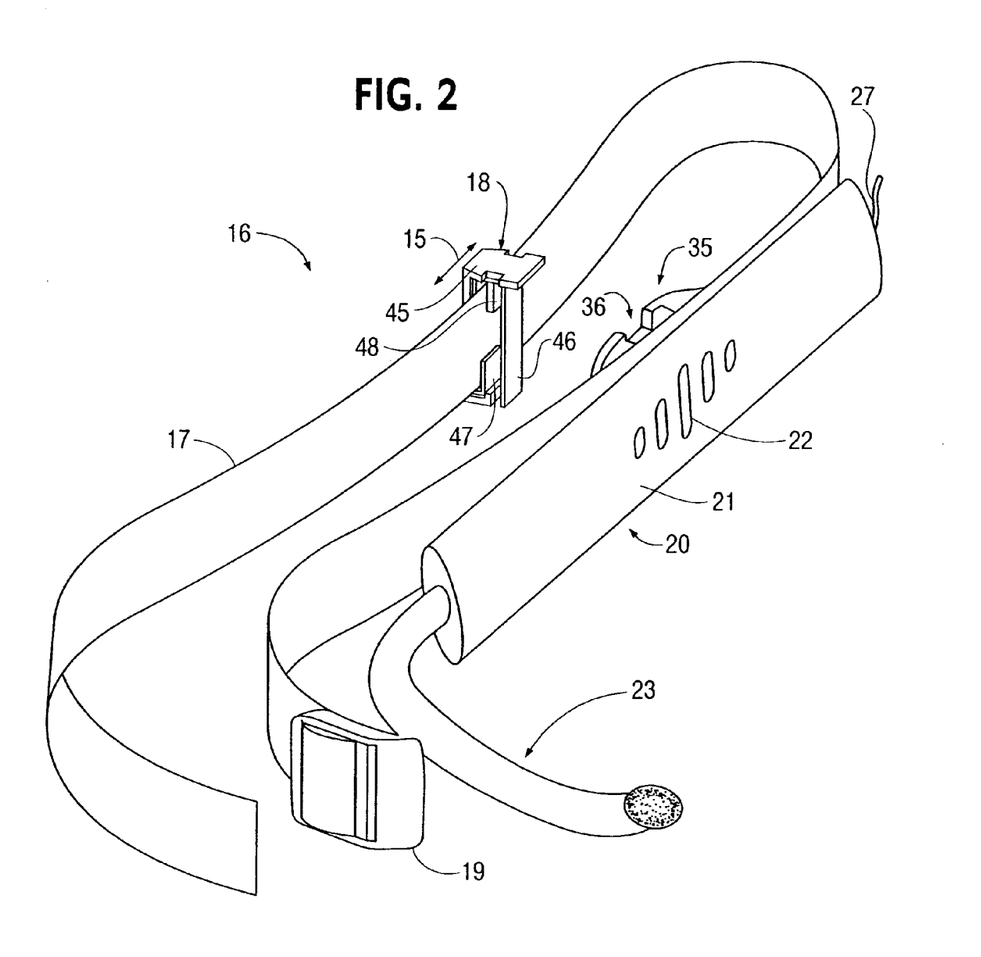
FIG. 2 is an illustration of a preferred embodiment of the invention.

The visual perspective of FIG. 2 allows the viewer to observe the entire elongated housing 21 of the hands-free device 20 as well as what will be referred to in the description that follows is a span portion 35 on the back of the elongated housing 21. A full view of the span portion 35 is presented in FIG. 3 and in a plan view in FIG. 10. The manner in which the strap 17 cooperates with span portion 35 will be explained in some detail hereinafter. It is sufficient to note at this point in the description of the invention that functionally the span portion 35 of the elongated housing 21 is coupled to the strap 17 over a section of the strap to thereby ensure that the elongated housing of the hands-free device 20 is physically secured to and stably aligned with the strap 17 in a generally parallel relationship to the strap over the strap section. It will be further appreciated from a study of subsequent figures that the hands-free device and the strap are slidably secured relative to each other.

A number of structural features of the movable module 18 are also discernable in FIG. 2, such as a movable module cover 45, which may be fabricated from plastic or other injection moldable material. A downwardly projecting mating metal clip element 46 is also shown. This mating clip element 46 and its related structure are shown in detail in FIG. 8, which will be described subsequently in the specification. An upwardly projecting strap retaining element 47 and downwardly projecting strap retaining element 48 are provided to cooperate with the strap 17, to permit the movable module 18 to slide over the strap 17. The housing span portion 35 is structurally configured at a central region 36 to receive the mating metal clip element 46 of the movable module 18, all of which will be described more fully later on in the specification.

Figure 3:
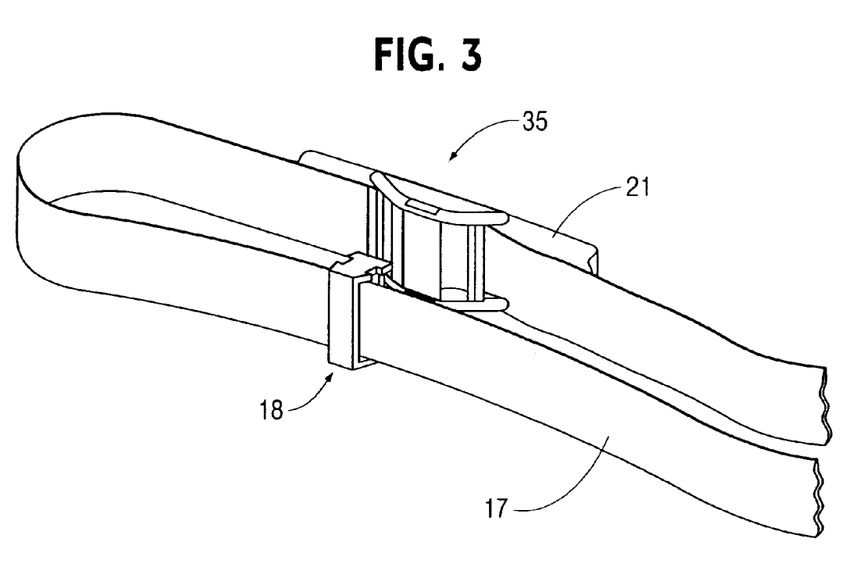
FIG. 3 is a partial illustration of the hands-free device, which depicts a portion of the hands-free device and the structural details of a span portion of a housing of the device and its relationship to a movable module positioned on a strap.

FIG. 3 depicts a portion of the hands-free device 21 positioned on strap 17, and shows in greater structural detail the span portion 35 and its relationship to the movable module 18, which is also shown on the strap 17, juxtaposed the span portion 35.

Figure 4:
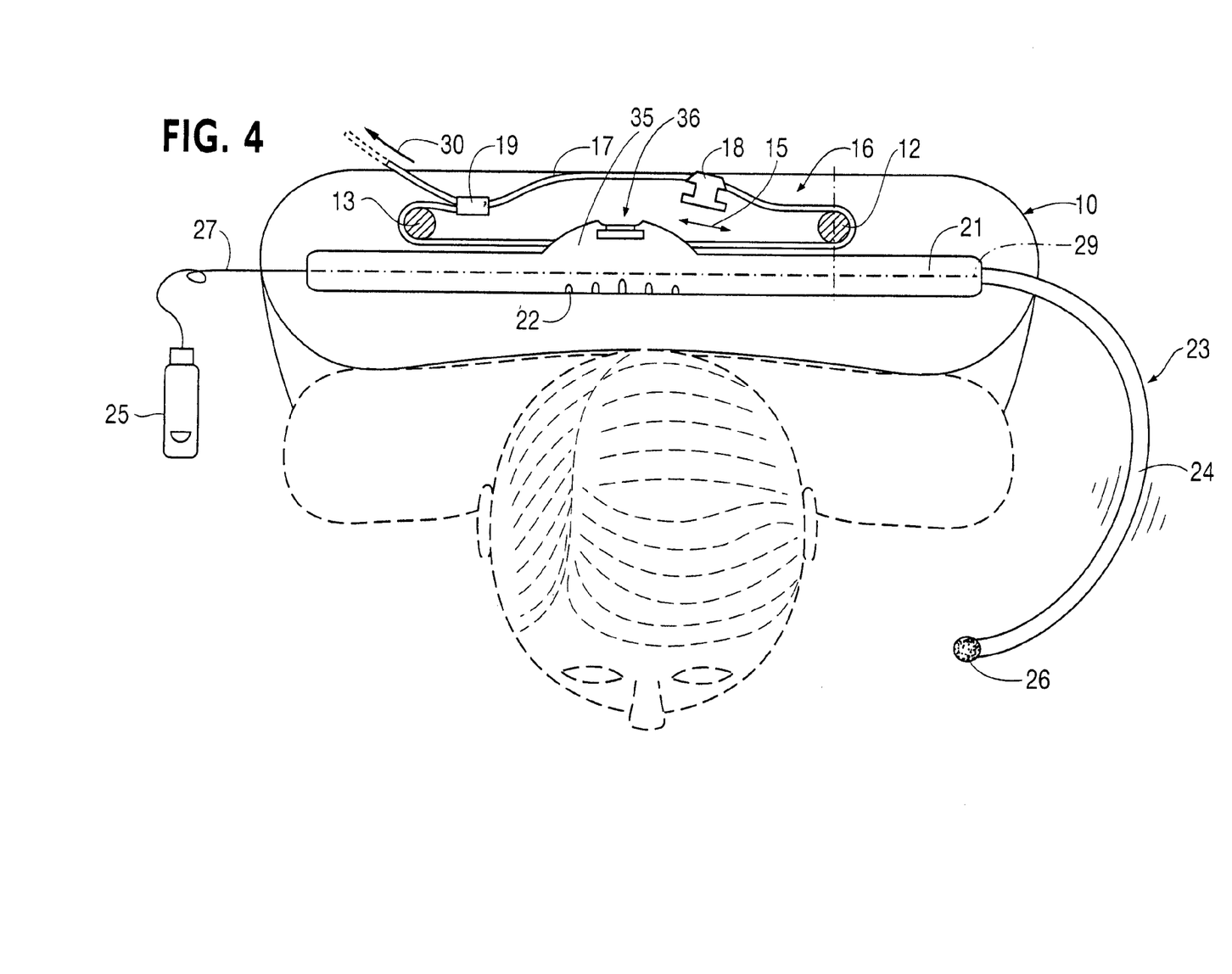
FIG. 4 is a top view of the hands-free device as shown in FIG. 1 when the device is in a position during installation between a headrest and a top of the vehicle seat, behind a neck and head of a mobile phone user.
Figure 5:
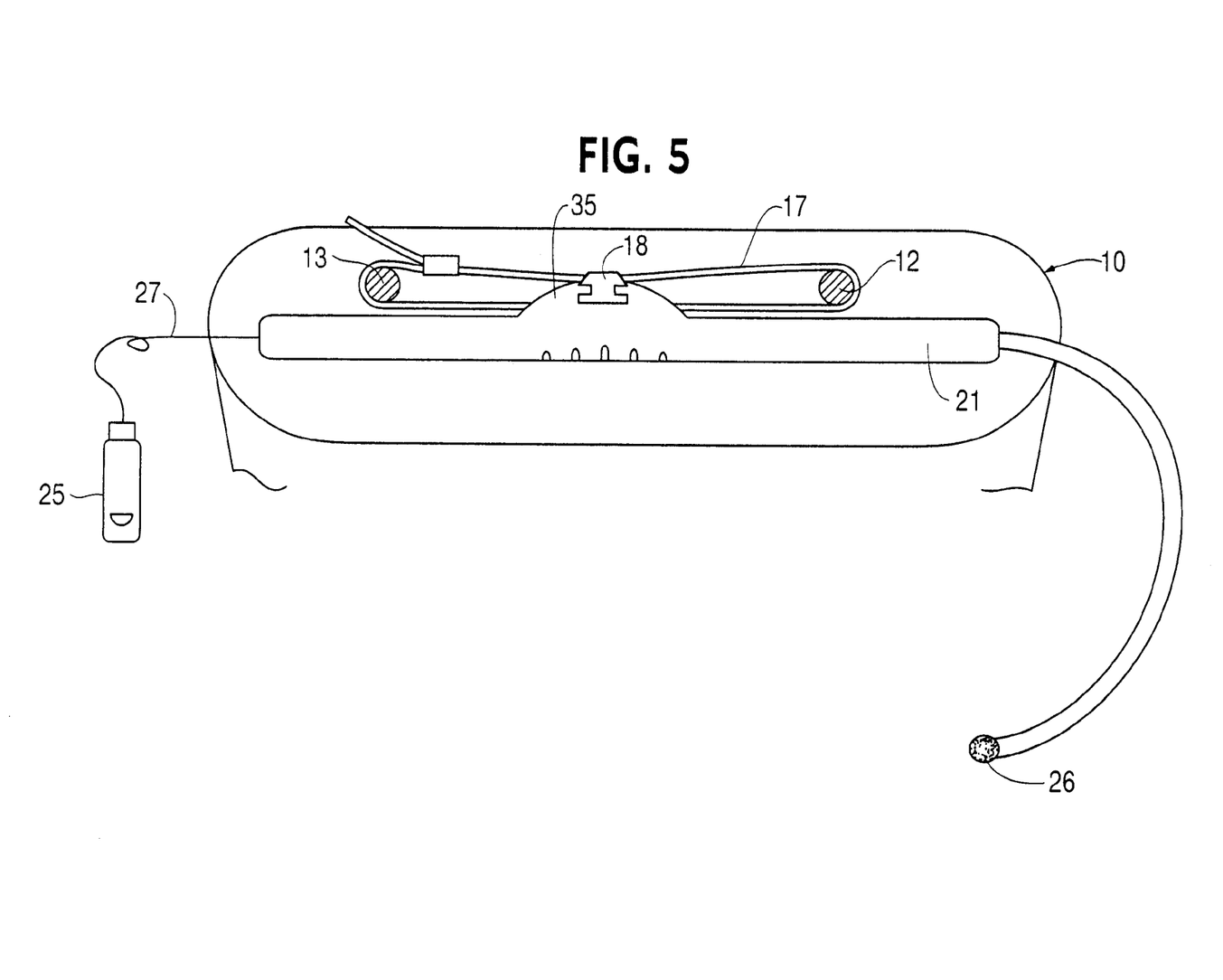
FIG. 5 is a top view of the hands-free device of FIG. 4 wherein the hands-free device is shown secured to a support structure of the headrest.

The description that follows is directed to the subject matter of FIG. 4 and FIG. 5. FIG. 4 is a top view of the hands-free device 20 as shown in FIG. 1, when the device 20, with its speaker 22, is in a position during installation behind the head and neck of a vehicle occupant shown in dotted outline. A centerline 29 of the elongated hands-free device 20 is shown positioned such that a projection of a line coincident with the centerline 29 of the device 20 intersects the pillars 12, 13 in a generally perpendicular manner. In this figure the headrest has been removed and only the support pillars 12 and 13 are shown in section. When the hands-free assembly 16 of FIG. 1 has been lowered into the position in FIG. 4 and the strap 17 has been pulled in the direction indicated by arrow 30, all slack in strap 17 will be removed. The slidable module 18 may then be positioned juxtaposed to the central region 36 of the span portion 35, as shown in FIG. 3. The metal clip element 46, better seen in FIG. 2, may then be manually moved to matingly engage the central region 36 of the span portion 35 of the elongated housing 21 to tension the strap to provide secure attachment to the pillars 12 and 13. FIG. 5 shows the movable module 18 locked in place in the span portion 35. At the moment the movable module 18 is fastened to the housing span portion 35, the strap 17 then takes on an overall "8" shaped configuration around the support pillars 12 and 13. The strap 17 around the pillars 12, 13, and the movable module 18 locked into the central region 36 of the span portion 35 provide a connecting structure that couples the hands-free device 20 to the connecting structure and simultaneously allows the connecting structure to engage the vehicle seat headrest support structure. In other words pillars 12, 13 secure the speaker 22 and microphone 26 to a place adjacent the head of an occupant of the seat 10 to allow the seat occupant to hear communications via the mobile phone 25 and the speaker 22 of the hands-free device, while the occupant may simultaneously respond via the microphone 26 of the hands-free device 20.

It is important to recognize that the just described connecting structure of the preferred embodiment is but one of many connecting structures that may be employed in the practice of the invention, as defined in the claims appended to the specification. For example, while the connecting structure of the preferred embodiment employs a strap and a movable clip module secured to a span portion of the housing of the hands-free device. The invention is intended to include, for example, in place of the movable clip module and span portion, a hook and loop fastener, where a surface of a strap secured to and adjacent the hands-free housing is provided with loop surface configuration and the strap that passes around the headrest support pillars is provided on its back side with a hook configured surface to engage and integrally secure the hands-free device in much the same fashion as the structure of the preferred embodiment of the invention previously described. In a similar manner the invention is intended to include as within the purview of the claims a strap that is strongly elastic in its composition such that the connecting structure function is accomplished by means of the inherent elasticity of the strap which, when secured to the hands-free device and around the support pillars, would similarly hold the hands-free device stably for use by a vehicle phone user. The invention further entertains as falling within the scope and spirit of the claimed invention the use of a hook shaped element that may be secured to the housing of the hands-free device by means of a resilient strap, such that when the hook element is manually secured to a headrest support pillar and the housing is provided with a second hook secured to the hands-free housing, the pair of hooks will cooperate to hold the hands-free device in a stable relation between the headrest and the top of a seat behind the head and neck region of an occupant of the vehicle seat. Yet another structural variation of the claimed invention would exist if the connecting structure were secured in part to the hands-free device and included a pair of resiliently-biased-apart, interconnected, headrest-pillar-engaging elements that would allow the pillar-engaging elements to be drawn towards each other and then released to be resiliently biased into cooperation with the headrest support pillars. This just described arrangement would also provide connecting structure that would be embraced by the spirit of the invention.

FIGS. 6, 7, 8 and 9 should be studied together in conjunction with the description that follows.

Figure 6:
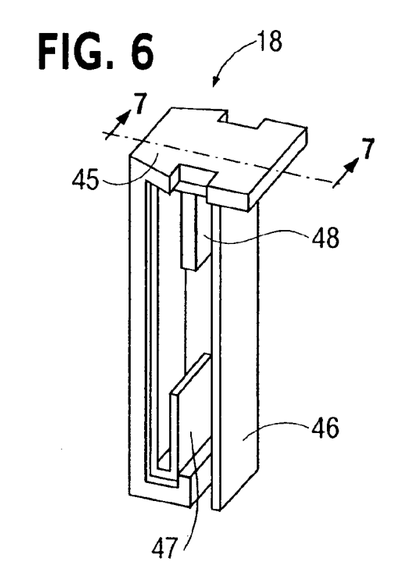
FIG. 6 illustrates a movable clip module as depicted in FIG. 2 with the strap shown in FIG. 2 removed.
Figure 7:
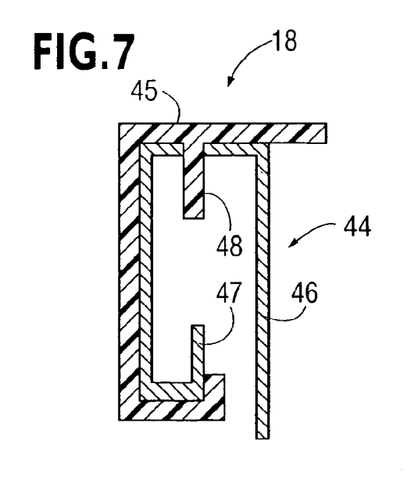
FIG. 7 is a full section of the movable clip module of FIG. 6 taken along the line 7—7.
Figure 8:
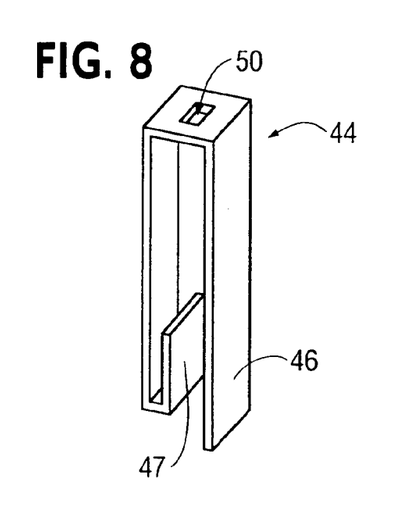
FIG. 8 is a clip element of the movable module of FIG. 6.
Figure 9:
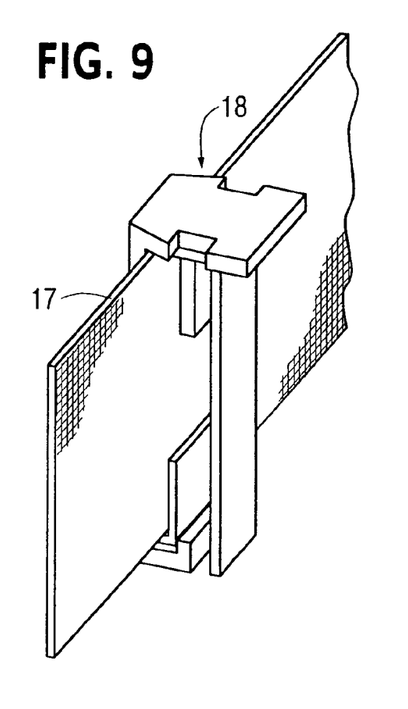
FIG. 9 shows the movable clip module of FIG. 2 shown in isolation from other components of the preferred embodiment of the invention.

FIG. 8 illustrates in some detail the overall structure of the movable clip module 18. The module 18 is comprised of module cover 45 which, as has been noted earlier, may be fashioned of a plastic material. Secured within the module cover 45 is a metal clip element 44, shown in isolation in FIG. 8. The metal clip element 44 is provided with a passageway 50, through which the downwardly projecting strap element 48 is formed by conventional injection molding at the time the module cover 45 is formed. The clip element is shown in the cross-section of FIG. 7. The module cover 45 may be injection molded around the metal clip element 44 to thereby form the movable module 18, as is depicted in FIG. 6. FIG. 9, in a manner similar to FIG. 2, shows the strap 17 in place in the movable clip module 18.

Figure 10:
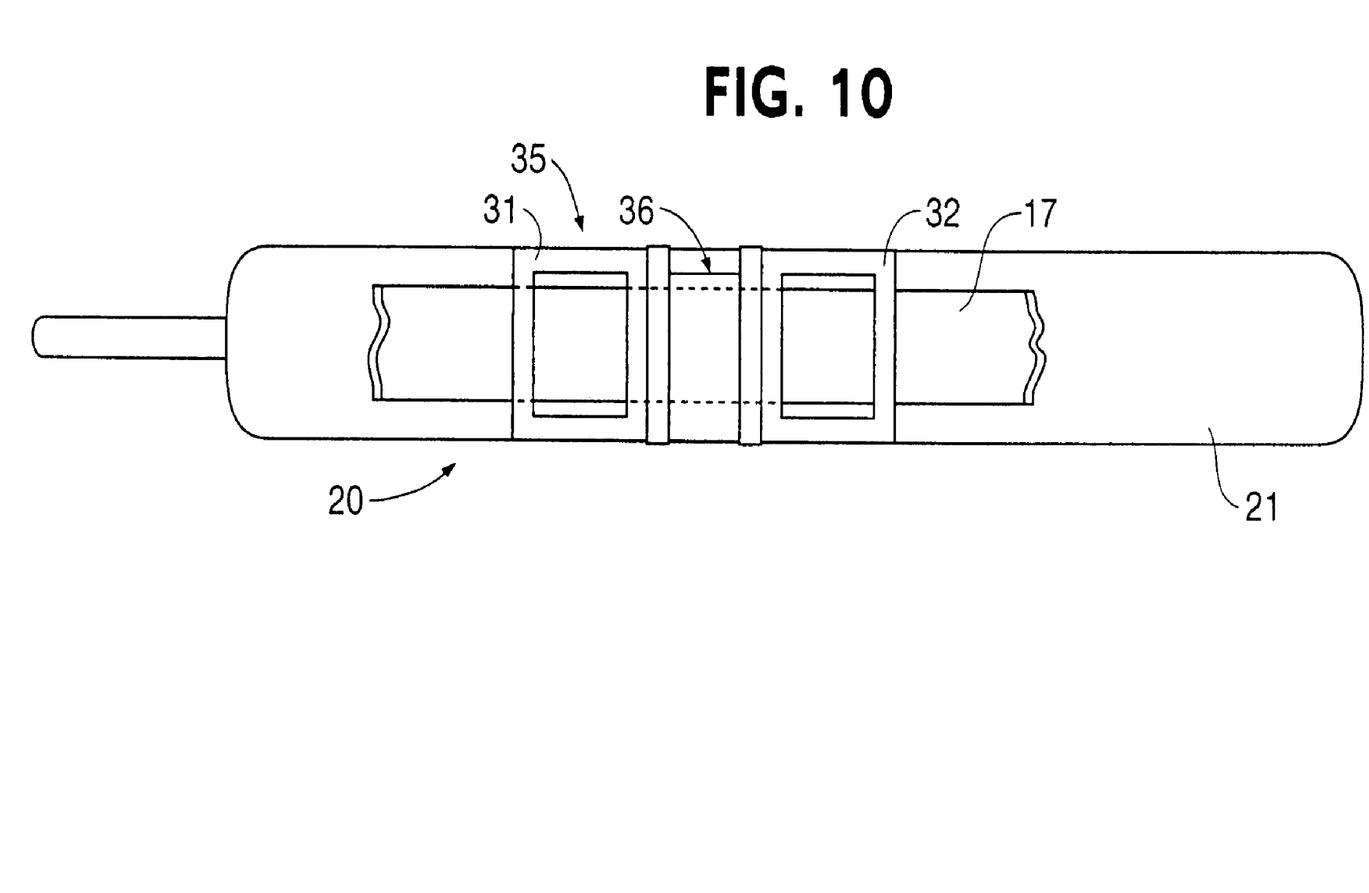
FIG. 10 is a view of the details of the hands-free device span portion as depicted in FIG. 3.

Turning now to FIG. 10 it will be observed that there is shown in some detail the span portion 35 on the backside of the elongated housing 21 of the hands-free device 20. It will be noted the span portion 35 of the elongated housing 21 is secured at two points 31, 32 to the housing 21. At these two points 31, 32, the span portion 35 and housing 21 cooperate to allow the strap 17 to pass between the span portion 35 and the housing 21. This structured arrangement causes the hands-free device to maintain a substantially parallel relationship along the cover of the device and a portion of the strap 17 sandwiched between the span portion 35 and the housing 21.

It follows from the description above that the wider the strap is relative to the width of the back of the hands-free device and the greater the distance between points 31, 32, the greater the structural stability of the hands-free device will be relative to the headrest support structure and the neck and head region of the occupant of the vehicle seat. In view of the foregoing, optimum physical stability of the hands-free device relative to the strap width will arise when, at a minimum, the span portion 35 is at least as long as the strap 17 is wide.

The instant invention also embraces a method of use of the mobile phone hands-free speaker and microphone assembly 16 with the vehicle seat 10, headrest 11 and seat headrest support structure (pillars 12 and 13). The method broadly includes the following steps.

First, positioning the generally elongated hands-free speaker and microphone assembly 16, the headrest support structure that structurally interconnects the seat 10 and headrest 11, and then securing the elongated device to the headrest support structure by means of a strap 17 that passes through a portion of the device in at least two, spaced apart locations. The strap 17 then passing around the support structure (12, 13), whereupon the strap 17 is fastened to itself to thereby provide a physically stable arrangement with the hands-free device 16 secured between the headrest 11 and the seat 110, to be in close proximity to a neck and head of a mobile phone user in the seat 10.

More specifically the invention entails positioning a generally elongated hands-free speaker and microphone device adjacent the pair of headrest support pillars 12, 13, such that a projection of a line coincident with a center line of the elongated device intersects the pair of pillars 12, 13 in a generally perpendicular manner. The method further involves securing the elongated device to the pair of pillars 12, 13 to thereby constrain the device positionally to be in a parallel relationship with the center line of the device and in a generally perpendicular relationship to the pillars 12, 13, to thereby provide a physically stable arrangement with the hands-free device 16 secured to the headrest 11 and seat 10 via the pillars 12, 13 in close proximity to the neck and head of a mobile phone user employing the device when the mobile phone user/occupant is in the vehicle seat 10.

Although the present invention has been described herein with reference to a particular method, materials and embodiments, the present invention is not intended to be limited to the particulars disclosed herein. Rather, the present invention extends to all functionally equivalent structures, methods and use, such as are within the scope of the appended claims.

What is claimed is:

1. A hands-free device including a housing for use with a mobile phone and a vehicle seat headrest support structure, the device including a speaker and a microphone assembly for use in combination with a strap that couples the device to the headrest support structure and simultaneously allows the strap to be tensioned and held in a tensioned condition by a strap tensioning mechanism to engage the vehicle seat headrest support structure to secure the speaker and microphone assembly adjacent a head of an occupant of the seat to thereby allow the seat occupant to hear information communicated via the mobile phone and the speaker of the hands-free device while the occupant may simultaneously communicate via a microphone of the microphone assembly, and wherein the tensioning mechanism, upon the application of tension to the strap, is positioned to engage and engages the housing of the device to maintain the strap under tension to secure the device to the headrest support structure.

2. The hands-free device of claim 1 wherein the strap includes a strap fastener secured to an end of the strap, and
   the housing of the device is elongated and includes a span portion that is in part coupled to the strap over a section of the strap to thereby ensure that the elongated housing of the device is physically secured to and stably aligned with the strap in a generally parallel relationship to the strap over the strap section.

3. The hands-free device of claim 2 wherein the span portion is at least as long as the strap is wide.

4. The hands-free device of claim 2 wherein the elongated housing portion that spans the strap section does so in such a manner that the device and strap are slidably secured relative to each other.

5. The hands-free device of claim 2 wherein the strap section resides between the housing span portion and the elongated housing.

6. The hands-free device of claim 5 wherein the housing span portion is structurally configured to provide a region thereof adapted to receive a mating portion of the fastener.

7. The hands-free device of claim 6 wherein the tensioning mechanism comprises a module fastener which is movable and which is secured to the strap for movement on the strap; and wherein
the module fastener is provided with a mating strap fastener that allows the module fastener to be fastened to the region of the housing span portion that is adapted to receive the module fastener after the device, the strap under tension and strap fastener have been secured as a unit to the headrest support structure.

8. The hands-free device of claim 7 wherein the module fastener comprises a clip including a portion thereof that engages the housing span portion to thereby tension the strap to secure the device and a portion of the strap to the module fastener which is slidably secured to the strap.

9. The hands-free device of claim 8 wherein the headrest support structure comprises:
a pair of separated support pillars that couple the headrest to the vehicle seat; and wherein
the strap extends from the strap fastener around a pillar, to and through the span portion of the device and then around another pillar and through the movable module secured thereto and finally returns to a secured relationship with the strap fastener; and
at the moment the movable module is fastened to the housing span portion, the strap then takes on an overall "8" shaped configuration around the support pillars, thereby establishing a stable physical relationship between the device, the strap and pillars behind the neck and head of a vehicle occupant.

10. The hands-free device of claim 9 wherein the elongated housing is adapted to support the speaker in such a manner that sound from the speaker exits the housing proximate a neck and head region of the occupant.

11. The hands-free device of claim 10 wherein the elongated housing is provided at one end thereof with a microphone assembly.

12. The hands-free device of claim 11 wherein the microphone assembly is comprised of a flexible arm secured at one and thereof to the elongated housing and to provide at another end with a microphone, the flexible arm and microphone are manually positionable to allow an occupant in the vehicle seat to adjust the microphone location to be proximate the mouth of the occupant.

13. The hands-free device of claim 1 wherein:
the strap includes a strap fastener secured to an end of the strap; and wherein
the device is coupled to the strap in at least two locations on the device and cooperates with the strap and strap fastener to allow the device to be adjustably secured to the headrest support structure.

14. The hands-free device of claim 13 wherein the strap fastener is a buckle.

15. The hands-free device of claim 13 wherein the device has a housing cover that is adapted to receive the strap at the two locations in such a manner that the device and strap are slidably secured relative to each other and thereby causes the device to maintain a substantially parallel relationship along the cover of the device and a portion of the strap.

16. The hands-free device of claim 15 wherein the housing cover is provided with a span portion thereof that is integral with and spans the two locations such that a section of the strap resides between the housing cover and the housing cover span portion.

17. The hands-free device of claim 16 wherein the tensioning mechanism comprises a module fastener which is secured to the strap housing span portion which is structurally configured to provide a region thereof adapted to receive a mating portion of the movable module fastener.

18. The hands-free device of claim 17 wherein the movable module fastener is secured to the strap for movement along the strap, the module fastener is provided with a mating strap fastener that allows the module fastener to be fastened to the mating portion of the housing span portion after the device, strap and strap fastener have been secured to the support structure of the headrest.

19. The hands-free device of claim 18 wherein the module fastener comprises a clip including a portion thereof that engages the housing span portion to thereby tension the strap to secure the device and a portion of the strap between the two locations to the module slidably secured to the strap.

20. The hands-free device of claim 19 wherein the headrest support structure comprises:
a pair of separated support pillars that couple the headrest to the vehicle seat; and wherein
the strap extends from the strap fastener around a pillar, to and through a portion of the device at the two locations and then around another pillar and through the movable module fastener secured thereto and finally to a secured relationship with the strap fastener; and
at the moment the movable module is fastened to the housing span portion, the strap then takes on an overall "8" shaped configuration around the support pillars to thereby establish a stable physical relationship between the device, the strap and pillars behind a neck and head of a vehicle occupant.

21. The hands-free device of claim 20 wherein in the housing cover is elongated and is adapted to support the speaker in such a manner that sound from the speaker exits the housing proximate a neck and head region of the occupant.

22. The hands-free device of claim 21 wherein the microphone assembly is of the gooseneck type.

23. The hands-free device of claim 21 wherein the microphone assembly is comprised of a flexible arm secured at one end thereof to the elongated housing and at another end with a microphone, the flexible arm and microphone being manually positionable to allow an occupant in the vehicle seat to adjust the microphone location to be proximate the mouth of the occupant.

24. A hands-free device for use with a mobile phone and a vehicle seat headrest support including a pair of pillars extending from a headrest into a top portion of a vehicle seat, the device comprising:
an elongated housing that includes therein a speaker, and is provided at one end thereof with a microphone assembly;
a strap; a strap tensioning mechanism; and wherein
the elongated housing is provided with a strap securing structure that accommodates a strap end that passes through the strap securing structure and around both pillars to be secured with a strap fastener at another end of the strap to thereby secure the device between the pillars and intermediate the headrest and a top of the seat; and
the strap tensioning mechanism engages the strap and, upon application of tension to the strap, is positioned to engage and engages the housing of the device to maintain the strap under tension to secure the device to the headrest.

25. The hands-free device of claim 24 wherein the strap securing structure is configured to couple a region of the strap in at least two locations on the device to the strap.

26. The hands-free device of claim 25 wherein the strap securing structure at the two locations allows the device to be slidably secured relative to the strap and thereby causes the device to maintain a substantially parallel relationship along the elongated housing and the region of the strap between the two locations which ensures the speaker and microphone assembly are consistently positioned behind a neck and head of a vehicle seat occupant when seated.

27. The hands-free device of claim 26 wherein the elongated housing is provided with a span structure that is integral with and spans the two locations such that the strap under tension when present will reside between the elongated shaped housing and the span structure.

28. The hands-free device of claim 27 wherein the span structure is configured to provide a region thereof adapted to receive a mating portion of the tensioning mechanism when the strap is under tension and is movable on the strap.

29. The hands-free device of claim 28 wherein the movable fastening unit is secured to the strap for movement along the strap; and the mating portion cooperates with the span structure after the device, the strap under tension and the strap fastener has been secured around the pillars and the fastening unit has been secured via the mating portion to the span structure.

30. The hands-free device of claim 24 wherein the strap fastener is a buckle.

31. A method of providing a mobile phone hands-free speaker and microphone device including a housing for use with a vehicle seat, headrest and headrest support structure comprising the following steps:
(a) positioning, with a strap including a strap tensioning mechanism, a generally elongated hands-free speaker and microphone device to be adjacent the headrest support structure that structurally interconnects the seat and headrest;
(b) securing the elongated device to the headrest support structure by means of the strap and the strap tensioning mechanism being attached to the housing of the device to tension the strap so that the strap passes under tension through a portion of the device in at least two spaced apart locations, the strap then passing around the support structure whereupon the strap is fastened to itself to thereby provide a physically stable arrangement with the hands-free device secured between the headrest and seat to be in close proximity to a neck and head of a mobile phone user and occupant in the vehicle seat.

32. A method of providing a mobile phone hands-free speaker and microphone device including a housing for use with a vehicle seat, headrest and headrest support structure comprising the following steps:
(a) positioning, with a strap including a strap tensioning means, a generally elongated hands-free speaker and microphone device to be adjacent the headrest support structure that interconnects the seat and the headrest;
(b) securing the elongated device to the headrest support structure by means of a strap tensioning means attached to the housing of the device to tension the strap so that the strap passes through portion of the device to thereby constrain the elongated device positionally to be in a parallel configuration with the strap, the strap then passing around the support structure whereupon the strap is fastened to itself to thereby provide a physically stable arrangement with the hands-free device secured between the headrest and seat in close proximity to a neck and head of a mobile phone user and occupant in the vehicle seat.

33. A method of securing a mobile phone hands-free speaker and microphone for use with a vehicle seat, headrest and headrest support structure including a pair of pillars that structurally connect the headrest and a top of the vehicle seat, the method comprising the following steps:
(a) positioning, with a strap including a strap tensioning mechanism, an elongated hands-free speaker and microphone device to be adjacent the pair of pillars such that a projection of a line coincident with a centerline of the elongated device intersects the pair of pillars in a generally perpendicular manner, and
(b) securing the elongated device to the pair of pillars by means of the strap and the strap tensioning mechanism being attached to the housing of the device to tension the strap to thereby constrain the device positionally to be in a parallel relationship with the centerline of the device and in a generally perpendicular relationship to the pillars, to thereby provide a physically stable arrangement with the hands-free device secured to the headrest and seat via the pillars in close proximity to a neck and head of a mobile phone user employing the device when the mobile phone user and occupant is in the vehicle seat.

* * * * *

UNITED STATES PATENT AND TRADEMARK OFFICE
CERTIFICATE OF CORRECTION

| | | |
|---|---|---|
| PATENT NO. | : 7,016,708 B1 | Page 1 of 1 |
| APPLICATION NO. | : 09/929023 | |
| DATED | : March 21, 2006 | |
| INVENTOR(S) | : Chan et al. | |

It is certified that error appears in the above-identified patent and that said Letters Patent is hereby corrected as shown below:

Column 8,
Line 65, "claim 2" should read --claim 4--.

Signed and Sealed this

Twenty-second Day of August, 2006

JON W. DUDAS
*Director of the United States Patent and Trademark Office*